United States Patent
Kim et al.

(10) Patent No.: US 8,107,669 B2
(45) Date of Patent: Jan. 31, 2012

(54) VIDEO WATERMARKING APPARATUS IN COMPRESSION DOMAIN AND METHOD USING THE SAME

(75) Inventors: Hwan Joon Kim, Yongin-si (KR); Mi Suk Huh, Yongin-si (KR); Dae Youb Kim, Yongin-si (KR); Chee Sun Won, Yongin-si (KR); Sung Min Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1320 days.

(21) Appl. No.: 11/785,913

(22) Filed: Apr. 20, 2007

(65) Prior Publication Data

US 2007/0291980 A1 Dec. 20, 2007

Related U.S. Application Data

(63) Continuation-in-part of application No. 11/711,680, filed on Feb. 28, 2007.

(30) Foreign Application Priority Data

Jun. 14, 2006 (KR) .................. 10-2006-0053638
Oct. 17, 2006 (KR) .................. 10-2006-0100975

(51) Int. Cl.
  *G06K 9/00* (2006.01)
  *G06K 9/36* (2006.01)
(52) U.S. Cl. ........................................ 382/100; 382/232
(58) Field of Classification Search .................. 382/100, 382/135, 232, 239, 250, 251, 248, 328; 352/85, 352/90, 122; 380/200, 202, 217; 345/589; 713/176, 189, 179; 704/500–503; 725/146; 726/26

See application file for complete search history.

(56) References Cited

U.S. PATENT DOCUMENTS

| | | | |
|---|---|---|---|
| 5,809,139 A | 9/1998 | Girod et al. | |
| 5,915,027 A | 6/1999 | Cox et al. | |
| 6,310,962 B1 * | 10/2001 | Chung et al. | 382/100 |
| 6,621,933 B2 * | 9/2003 | Chung et al. | 382/233 |
| 6,700,991 B1 * | 3/2004 | Wu et al. | 382/100 |
| 6,738,493 B1 * | 5/2004 | Cox et al. | 382/100 |
| 6,809,792 B1 * | 10/2004 | Tehranchi et al. | 352/85 |
| 7,496,197 B2 * | 2/2009 | Troyansky et al. | 380/202 |
| 7,779,271 B2 * | 8/2010 | Langelaar | 713/189 |
| 2001/0021260 A1 * | 9/2001 | Chung et al. | 382/100 |
| 2001/0049788 A1 * | 12/2001 | Shur | 713/179 |
| 2002/0129253 A1 * | 9/2002 | Langelaar | 713/176 |
| 2003/0103645 A1 * | 6/2003 | Levy et al. | 382/100 |
| 2008/0130944 A1 * | 6/2008 | Johnson et al. | 382/100 |
| 2010/0146284 A1 * | 6/2010 | Geyzel et al. | 713/176 |

FOREIGN PATENT DOCUMENTS

JP 2002-152742 5/2002

(Continued)

*Primary Examiner* — Samir Ahmed
*Assistant Examiner* — Mehdi Rashidian
(74) *Attorney, Agent, or Firm* — NSIP Law

(57) ABSTRACT

A video watermarking apparatus and method are provided, including an information provider for providing spatial domain segmentation information of an image with respect to a compressed video, a grouping unit for grouping the compressed video, based on the spatial domain segmentation information, and generating a grouped spatial domain, an extraction domain selector for selecting an extraction domain for extracting a watermark from the grouped spatial domain, and a watermark extractor for extracting a watermark bit inserted in the extraction domain.

19 Claims, 12 Drawing Sheets

FOREIGN PATENT DOCUMENTS

| | | |
|---|---|---|
| JP | 2002-171494 | 6/2002 |
| JP | 2004-166018 | 6/2004 |
| JP | 2004-304834 | 10/2004 |
| KR | 10-2001-0024001 | 3/2001 |
| KR | 10-2001-0074604 A | 8/2001 |
| KR | 10-2002-0088086 | 11/2002 |
| WO | WO 2005/004493 A1 | 1/2005 |
| WO | WO 2005/004494 A1 | 1/2005 |

* cited by examiner

FIG. 7

| | | | |
|---|---|---|---|
| 1 | ... | M | $b_1$ |
| 2 | | | |
| 3 | | | $b_2$ |
| 4 | | | |
| 5 | | | $b_3$ |
| 6 | | | |
| 7 | | | $b_4$ |
| 8 | | | |
| 9 | | | $b_1$ |
| | | | |
| | | | $b_2$ |
| | | | |
| | | | $b_3$ |
| | | | |
| 16 | | | $b_4$ |
| 17 | | | $b_1$ |
| | | | |
| | | | $b_2$ |
| | | | |
| | | | $b_3$ |
| ⋮ | ⋮ | | |
| N | | | $b_4$ |

FROM S1120

CALCULATE DIFFERENCE BETWEEN DCT DC VALUE OF ORIGINAL IMAGE AND DCT DC VALUE OF COMPRESSED IMAGE FOR EACH DCT BLOCK — S1210

EXTRACT MAXIMUM DCT DC VALUE DIFFERENCE AND MINIMUM DCT DC VALUE DIFFERENCE (MAXIMUM VALUE AND MINIMUM VALUE) OF DCT BLOCKS WHERE VERTICAL LOCATIONS ARE IDENTICAL FROM DCT BLOCKS CONFIGURING SLICES — S1220

CALCULATE DIFFERENCE BETWEEN MAXIMUM VALUE AND MINIMUM VALUE — S1230

SELECT EXTRACTION DOMAIN, BASED ON DIFFERENCE BETWEEN MAXIMUM VALUE AND MINIMUM VALUE — S1240

TO S1140

VIDEO WATERMARKING APPARATUS IN COMPRESSION DOMAIN AND METHOD USING THE SAME

CROSS-REFERENCE TO RELATED APPLICATION

This is a continuation-in-part application of U.S. application Ser. No. 11/711,680, filed Feb. 28, 2007, which claims the benefit under 35 U.S.C. §119(a) of Korean Patent Application No. 10-2006-0053638, filed Jun. 14, 2006, in the Korean Intellectual Property Office, and claims the benefit under 35 U.S.C. §119(a) of Korean Patent Application No. 10-2006-0100975, filed Oct. 17, 2006, in the Korean Intellectual Property Office, the entire disclosures of which are incorporated herein by reference.

BACKGROUND OF THE INVENTION

1. Field of the Invention

The present invention relates to a video watermarking apparatus and method. More particularly, the present invention relates to an apparatus and method of watermarking a video in a compression domain, substantially resisting a digital video interactive (DVI) capture attack of the video.

2. Description of Related Art

Generally, due to the pervasiveness of digital media and various multimedia data transmission and storage devices, and the development of authoring tools, multimedia data may be easily copied and distributed via a network. Therefore, new services are provided, but problems relating to the adequate protection of the copyright of the digital media have seriously increased.

Watermarking is a method provided for protecting the copyright of the digital media and comprises the steps of inserting a watermark that is a signature of an author or information identifying the author into the digital media. In doing so, the method solves the problem of protecting the copyright by inserting the watermark into the digital media, and when a problem of proving copyright infringement occurs, allows for extracting the watermark to show proof of copyright ownership.

Methods of watermarking may be largely classified into methods of watermarking in a spatial domain, and methods of watermarking in a compression domain.

Since various algorithms may be applied to conventional methods of watermarking in the spatial domain, benefits include substantially resisting various attacks.

However, since most video is stored and transmitted in a compressed form, to apply a method of watermarking in the spatial domain, an entire compressed video has to be uncompressed and the uncompressed video has to be compressed again after inserting a watermark into the uncompressed video. Therefore, there are problems relating to inserting the watermark and compressing the uncompressed video again, and there are an undesirably large amount of required computations that are related to the process of uncompressing the entire compressed video.

A method of reducing the large amount of computations, which is a disadvantage of the conventional method of watermarking in the spatial domain, includes a method of watermarking in the compression domain, operating in a bit stream of the compression domain. However, in such conventional methods of watermarking in the compression domain, since a watermark is directly inserted into/extracted from a compressed discrete cosine transform (DCT) coefficient, the methods can be relatively ineffective against a recompression attack of a video.

Hartung, Cox, and Langelaar methods are representative examples of conventional methods of watermarking in a compression domain. The Hartung method for example, as disclosed in U.S. Pat. No. 5,809,139, the entire disclosure of which is incorporated herein by reference, has a disadvantage of requiring a large amount of computations because a very complex circuit is required for preventing error propagation and an increase of bit rates, due to a watermark in a compression domain.

In the Cox method for example, as disclosed in U.S. Pat. No. 5,915,027, the entire disclosure of which is incorporated herein by reference, since an inserted watermark affects only frequency features of data in a compression domain, a simple and effective attack against the watermark can occur when there is a change in bit rates and frame structures while recompression of a video and additional computation caused by shaping of the watermark is required.

In the Langelaar method, a very quick computation is possible in a compression domain but there is a disadvantage of having a structure that is very weak in recompression of a video.

Accordingly, a need exists for a system and method for effectively and efficiently watermarking a video in a compression domain.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method of watermarking a video in a compression domain that is capable of substantially resisting a recompression attack and a capture attack via a digital video interactive (DVI) board.

Another aspect of exemplary embodiments of the present invention is to provide an apparatus and method of watermarking a video that is capable of extracting an inserted watermark from a monotonic domain of a spatial domain of an image segmented in a horizontal slice in a compression domain of an image captured via a DVI board.

Another aspect of exemplary embodiments of the present invention is to provide an apparatus and method of watermarking a video that is capable of extracting a watermark from an image being greatly distorted.

According to another aspect of exemplary embodiments of the present invention, a video watermark detection apparatus is provided comprising an information provider for providing spatial domain segmentation information of an image with respect to a compressed video, a grouping unit for grouping the compressed video, based on the spatial domain segmentation information, and generating a grouped spatial domain, an extraction domain selector for selecting an extraction domain for extracting a watermark from the grouped spatial domain, and a watermark extractor for extracting a watermark bit inserted in the extraction domain.

In an exemplary embodiment of the present invention, the information provider can provide the spatial domain segmentation information by segmenting the spatial domain of the image for each predetermined horizontal slice.

In an exemplary embodiment of the present invention, the extraction domain selector can comprise a direct current (DC) value difference calculator for calculating a difference between a discrete cosine transform (DCT) DC value of an original image and a DCT DC value of the compressed image in an identical DCT block, an image distortion calculator for calculating a difference between a maximum value and a minimum value from the calculated DCT DC value difference of DCT blocks where vertical locations are identical, from DCT blocks configuring slices where bit rows of the watermark are inserted, and an extraction domain determiner for selecting an extraction domain for extracting the watermark based on the difference between the maximum value and the minimum value.

In an exemplary embodiment of the present invention, the extraction domain determiner can select the extraction domain for extracting the watermark when the difference between the maximum value and the minimum value is less than a predetermined value (e.g., a predetermined basic critical value).

In an exemplary embodiment of the present invention, the extraction domain selector can select a monotonic domain of the image as the extraction domain for extracting the watermark.

According to another exemplary embodiment of the present invention, a video watermark insertion apparatus is provided comprising an information extractor for extracting spatial domain information of an image with respect to code words configuring a bit stream compressed by a video encoder, a domain grouping unit for grouping the code words into the spatial domain of each predetermined horizontal slice, based on the extracted spatial domain information, and a watermark inserter for inserting a watermark bit in the code words grouped for the each horizontal slice.

According to still another aspect of embodiments of the present invention, a video watermark detection method is provided comprising steps of providing spatial domain segmentation information of an image with respect to a compressed video, grouping the compressed video, based on the spatial domain segmentation information, and generating a grouped spatial domain, selecting an extraction domain for extracting a watermark from the grouped spatial domain, and extracting a watermark bit inserted in the extraction domain.

According to yet another aspect of embodiments of the present invention, a video watermark insertion method is provided comprising steps of extracting spatial domain information of an image with respect to code words configuring a bit stream compressed by a video encoder, grouping the code words into the spatial domain of each predetermined horizontal slice, based on the extracted spatial domain information, and inserting a watermark bit in the code words grouped for the each horizontal slice.

Other objects, advantages, and salient features of embodiments of the present invention will become apparent to those skilled in the art from the following detailed description, which, taken in conjunction with the annexed drawings, discloses exemplary embodiments of the present invention.

BRIEF DESCRIPTION OF THE DRAWINGS

The above and other objects, features, and advantages of certain exemplary embodiments of the present invention will become more apparent from the following detailed description, taken in conjunction with the accompanying drawings, in which:

FIG. 7 is an exemplary diagram illustrating an image having an M×N number of discrete cosine transform (DCT) blocks;

FIG. 12 is a flowchart illustrating operation S1130 of FIG. 11 in greater detail.

Throughout the drawings, the same drawing reference numerals will be understood to refer to the same elements, features, and structures.

DETAILED DESCRIPTION OF EXEMPLARY EMBODIMENTS

The matters defined in the following description such as detailed constructions and elements are provided to assist in a comprehensive understanding of exemplary embodiments of the present invention. Accordingly, those of ordinary skill in the art will recognize that various changes and modifications of the exemplary embodiments described herein can be made without departing from the scope and spirit of the present invention. Also, descriptions of well-known functions and constructions are omitted for clarity and conciseness.

Figure 1:
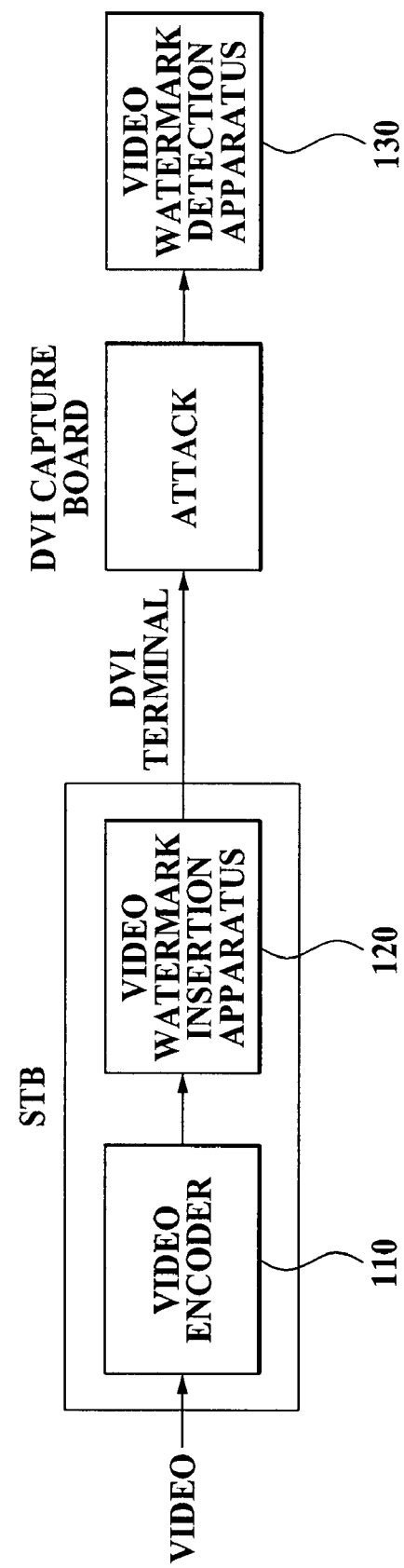
FIG. 1 is a block diagram illustrating a system according to an exemplary embodiment of the present invention.

FIG. 1 is a block diagram illustrating a system according to an exemplary embodiment of the present invention.

Referring to FIG. 1, an exemplary system according to an embodiment of the present invention comprises a set-top box (STB) including a video encoder 110 and a video watermark insertion apparatus 120, and a video watermark detection apparatus 130.

The video encoder 110 compresses data by encoding analogue video data input from an external source to reduce an amount of data when compared to the original analogue video data. In an exemplary embodiment of the present invention, the video encoder can comprise a Motion Picture Experts Groups (MPEG)-2 encoder, an MPEG-4 encoder, and the like.

The video watermark insertion apparatus 120 inserts a watermark into the compressed data, i.e. a bit stream, to protect against intentional attacks after outputting a compressed video, such as recompression of a video, a decoded digital video form, a decoded analogue form, and the like.

In an exemplary embodiment of the present invention, the video watermark insertion apparatus 120 segments the compressed bit streams of an image into groups with respect to a predetermined spatial domain for each horizontal slice, inserts a watermark bit into each of the bit stream groups, recombines each of the bit stream groups including the watermark bit, and transmits corresponding video contents including the watermark to a desired destination.

The video watermark detection apparatus 130 detects a watermark from any of intentionally attacked compressed video contents or normally received compressed video contents. In an exemplary embodiment of the present invention, the watermark detection apparatus 130 detects the watermark regardless of a video form such as video contents deformed by the intentional attack, normally received video contents, and the like.

Here, the watermark detection apparatus 130 generates a heavy distortion of the video when an attacker attacks the video including the watermark output via a digital video interactive (DVI) port by using a DVI capture board, similar to the exemplary embodiment illustrated in FIG. 1.

Therefore, since it is difficult to correctly extract a watermark inserted in a video captured by a DVI capture board, from all spatial domains, the video watermark detection apparatus 130 according to embodiments of the present invention extracts a domain where there is a possibility that a watermark remains, and extracts a watermark from an extraction domain.

Figure 2:
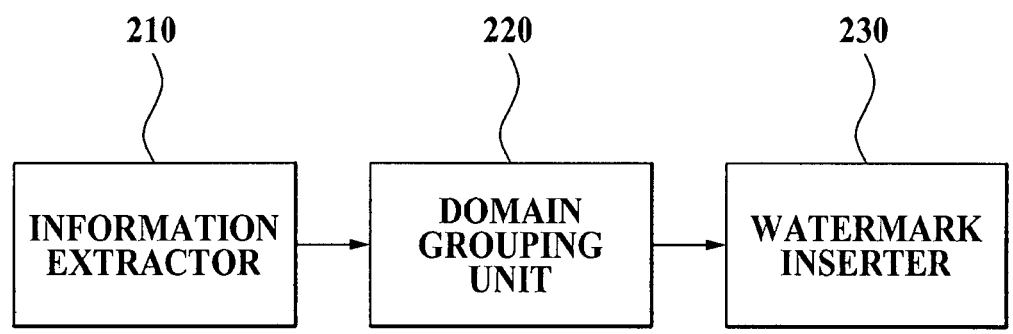
FIG. 2 is a block diagram illustrating a detailed configuration of a video watermark insertion apparatus of FIG. 1.

FIG. 2 is a block diagram illustrating a detailed configuration of a video watermark insertion apparatus 120 of FIG. 1.

Referring to FIG. 2, an exemplary video watermark insertion apparatus 120 comprises an information extractor 210, a domain grouping unit 220, and a watermark inserter 230.

The information extractor 210 extracts spatial domain information of an image with respect to code words configuring a bit stream compressed by a video encoder, such as a width of the image, a length of the image, and the like. Specifically, in order to segment and group the compressed bit stream into the spatial domain of the image, the spatial domain information of the image is extracted from each of the code words.

The domain grouping unit 220 groups the code words into the spatial domain of each predetermined horizontal slice, based on the spatial domain information extracted from the information extractor 210.

Specifically, to show domains respectively segmented for each horizontal slice in the spatial domain, the compressed bit stream is grouped for each spatial domain of each horizontal slice.

The watermark inserter 230 inserts a watermark bit in the code words grouped for each horizontal slice. In an exemplary embodiment of the present invention, the watermark bit is added to all discrete cosine transform (DCT) direct current (DC) values configuring the slice.

Figure 3:
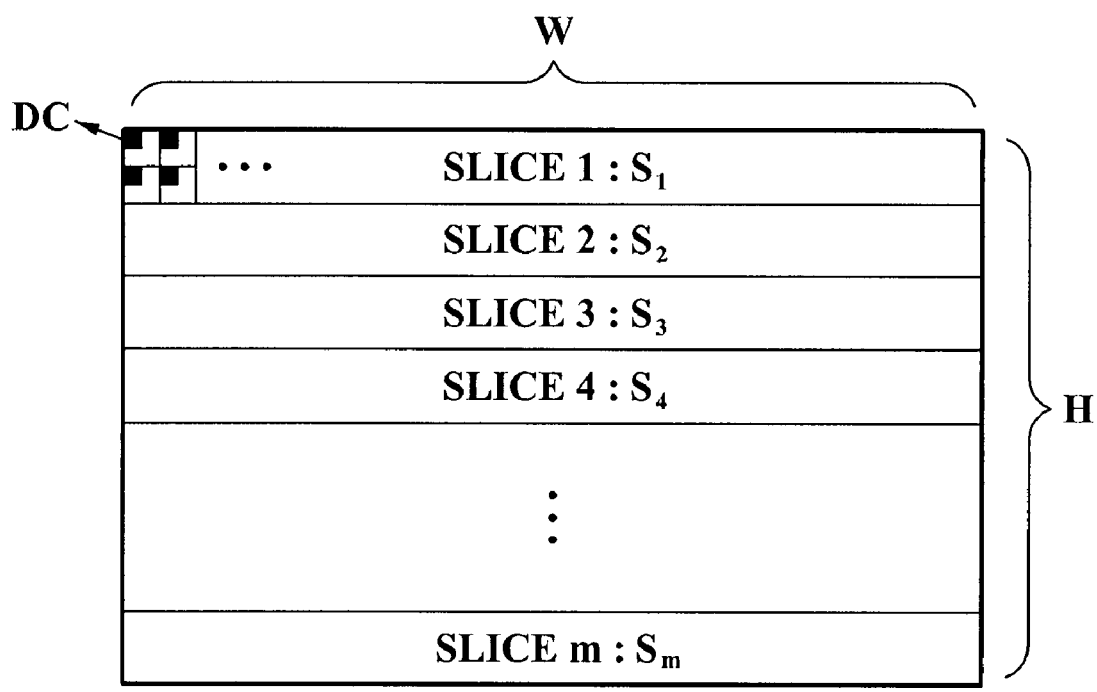
FIG. 3 is a diagram illustrating a video watermark insertion apparatus according to an exemplary embodiment of the present invention.

FIG. 3 is a diagram illustrating a video watermark insertion apparatus according to an exemplary embodiment of the present invention.

Referring to FIG. 3, an image of a video is shown segmented into the number "m" of slices ($S_1 \sim S_m$) and is made up of W×H pixels.

In an exemplary embodiment of the present invention, the image is made up of "W/8×H/8" number of DCT blocks, and each slice has "W/8×H/8" number of DC values, but is not limited thereto.

In an exemplary embodiment of the present invention, the watermark bit is added to DC values of DCT blocks configuring a slice. When K bits of watermark bit rows, for example, watermark bit rows of $b_1, b_2, \ldots,$ and $b_K$ are inserted, the watermark bit is inserted in the slices in sequential order. Specifically, a watermark bit $b_1$ is added to DC values of all DCT blocks configuring a slice $S_1$, a watermark bit $b_2$ is added to DC values of all DCT blocks configuring a slice $S_2$, and a watermark bit $b_K$ is added to DC values of all DCT blocks configuring a slice $S_K$. Also, a watermark bit $b_1$ is added to DC values of all DCT blocks configuring a next slice, i.e. a slice $S_{K+1}$.

For example, when a watermark bit row corresponds to four bits of "1001", since a first bit and a fourth bit of a watermark bit row correspond to "1", a "1" is added to DC values of all DCT blocks configuring a slice $S_1$ and a slice $S_4$, and since a second bit and a third bit of a watermark bit row correspond to "0", a "0" is added to DC values of all DCT blocks configuring a slice $S_2$ and a slice $S_3$. Specifically, DC values of all DCT blocks configuring a slice $S_2$ and a slice $S_3$ are constant. The above process is performed with respect to all slices in sequential order.

Figure 4:
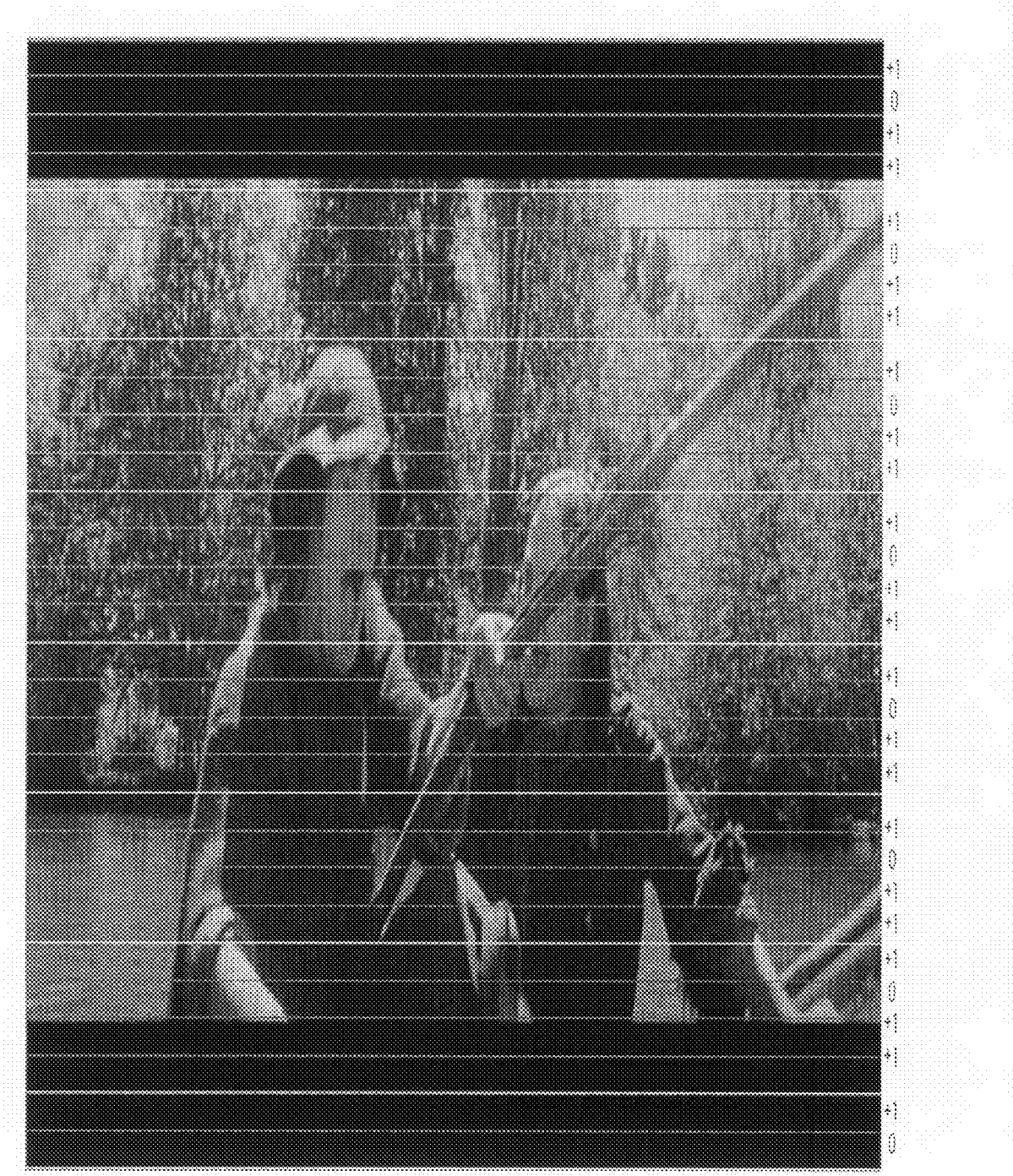
FIG. 4 illustrates an example of a video image where watermark bits are inserted according to an exemplary embodiment of the present invention.

FIG. 4 illustrates an example of a video image where watermark bits are inserted according to an embodiment of the present invention.

As illustrated in FIG. 4, the watermark insertion apparatus according to an embodiment of the present invention classifies a video image into a spatial domain for each horizontal slice, and repeatedly inserts a predetermined watermark bit row of "1", "0", "1", and "1" in the classified slice in sequential order.

Figure 5:
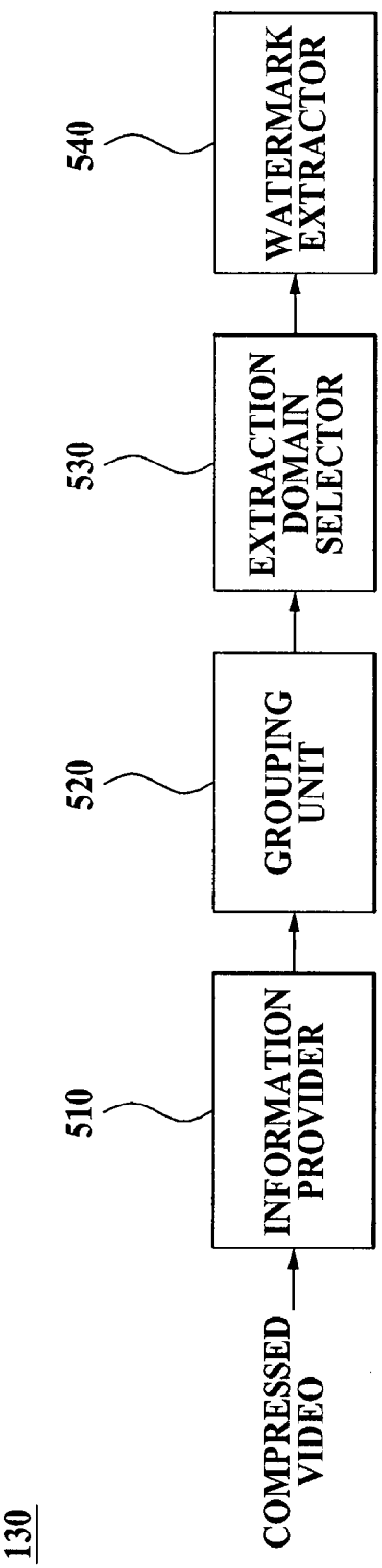
FIG. 5 is a block diagram illustrating a detailed configuration of a video watermark detection apparatus of FIG. 1.

FIG. 5 is a block diagram illustrating a detailed configuration of a video watermark detection apparatus 130 of FIG. 1.

Referring to FIG. 5, the video watermark detection apparatus 130 comprises an information provider 510, a grouping unit 520, an extraction domain selector 530, and a watermark extractor 540.

A compressed video is input to the information provider 510 and the information provider 510 provides spatial domain segmentation information of an image with respect to the compressed video.

In an exemplary embodiment of the present invention, the information provider 510 can provide the spatial domain segmentation information segmented for each predetermined horizontal slice with respect to the compressed video.

The grouping unit 520 groups the compressed video, based on the spatial domain segmentation information, and generates a grouped spatial domain. Specifically, the grouping unit 520 groups the code words configuring a bit stream of the compressed video into the spatial domain of each predetermined horizontal slice.

The extraction domain selector 530 selects an extraction domain for extracting a watermark from the grouped spatial domain.

In an exemplary embodiment of the present invention, the extraction domain selector 530 can analyze video image distortion and select the extraction domain.

In an exemplary embodiment of the present invention, the extraction domain selector 530 can select a monotonic domain of the image as the extraction domain. Specifically, since distortion of the image is significantly generated in a domain of the image excluding a high frequency domain of the image and a monotonic domain of the image when an attack is made via a DVI capture board, a possibility that there is a watermark becomes low. Accordingly, a monotonic domain where a possibility that there is a watermark is high can be selected as the extraction domain.

The extraction domain selector 530 is described in greater detail below with reference to FIG. 6.

Figure 6:
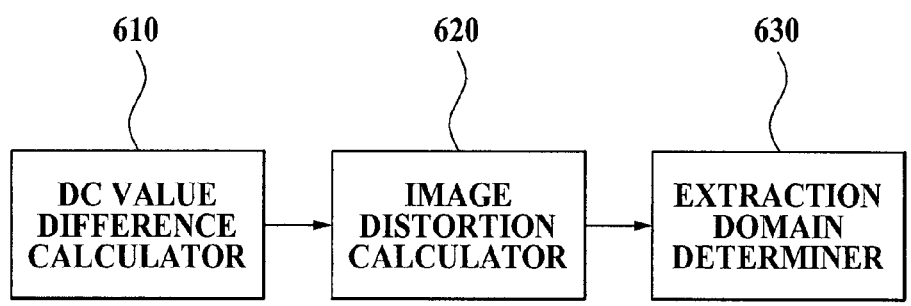
FIG. 6 is a block diagram illustrating a detailed configuration of an extraction domain selector of FIG. 5.

FIG. 6 is a block diagram illustrating a detailed configuration of an extraction domain selector 530 of FIG. 5.

Referring to FIG. 6, the extraction domain selector 530 comprises a DC value difference calculator 610, an image distortion calculator 620, and an extraction domain determiner 630.

The DC value difference calculator 610 calculates a difference between a DCT DC value of an original image and a DCT DC value of the compressed image in an identical DCT block. In an exemplary embodiment of the present invention, the original image indicates an image in a state where a watermark is not inserted and there is no distortion, and the compressed image indicates an image in a state where a watermark is inserted and there is distortion.

In an exemplary embodiment of the present invention, the DC value difference calculated in the DC value difference calculator 610 can be shown as in Equation (1) below.

$$E(x,y)=D(x,y)-D'(x,y) \quad (1)$$

Here, E(x,y) denotes the DC value difference, D(x,y) denotes the DCT DC value of the original image, D'(x,y) denotes the DCT DC value of the compressed image, x denotes a DCT block of a horizontal axis, and y denotes a DCT block of a vertical axis.

The image distortion calculator 620 calculates a difference between a maximum value and a minimum value from the calculated DCT DC value difference of DCT blocks where vertical locations are identical, from DCT blocks configuring slices where bit rows of the watermark are inserted.

In an exemplary embodiment of the present invention, the difference between the maximum value and the minimum value calculated in the image distortion calculator 620 can be shown as in Equation (2) below.

$$\overline{E}(x,y)=\max(E(x,y), E(x,y+1), E(x,y+2), \ldots, E(x,y+2K))$$

$$\underline{E}(x,y)=\min(E(x,y), E(x,y+1), E(x,y+2), \ldots, E(x,y+2K))$$

$$\Delta(x,y)=\overline{E}(x,y)-\underline{E}(x,y) \quad (2)$$

Here, $\overline{E}(x,y)$ denotes a maximum value from DCT DC value differences from E(x,y) to E(x,y+2K), $\underline{E}(x,y)$ denotes a minimum value from DCT DC value differences from E(x,y) to E(x,y+2K), K denotes a length of a watermark bit row, and $\Delta(x, y)$ denotes a difference between the maximum value and the minimum value.

The extraction domain determiner 630 selects an extraction domain for extracting the watermark, based on the difference between the maximum value and the minimum value.

In an exemplary embodiment of the present invention, the extraction domain selected in the extraction domain determiner 630 can be shown as in Equation (3) below.

$$A(x, Y) = \begin{cases} 1, & \text{if } ((\Delta(x, y) \leq T) \,\&\&\, (E(x, Y) > AVG(x, y))) \\ -1, & \text{if } ((\Delta(x, y) \leq T) \,\&\&\, (E(x, Y) > AVG(x, y))) \\ 0, & \text{otherwise} \end{cases} \quad (3)$$

$$Y = y, y+1, \ldots y+2K$$

$$AVG(x, y) = \frac{\overline{E}(x, y) + \underline{E}(x, y)}{2}$$

Here, A(x,Y) denotes an extraction domain value in a DCT block (x, Y), T denotes a basic critical value, and AVG(x,y) denotes an average value of the maximum value and the minimum value.

The extraction domain selector 530 of FIG. 5 is further described with reference to FIG. 7.

FIG. 7 is an exemplary diagram illustrating an image having an M×N number of DCT blocks.

As illustrated in FIG. 7, a watermark of four bits (b1, b2, b3, and b4) is shown repeatedly inserted at intervals of four slices. Specifically, b1 is inserted in a DCT block 1 and a DCT block 2, b2 is inserted in a DCT block 3 and a DCT block 4, b3 is inserted in a DCT block 5 and a DCT block 6, and b4 is inserted in a DCT block 7 and a DCT block 8.

The extraction domain selector 530 determines whether a domain has a possibility that there is a watermark, even though an image is distorted due to using eight vertical DCT blocks where a watermark bit row is inserted, and selects the extraction domain. Specifically, the image distortion calculator 620 detects a maximum value and a minimum value with respect to a DCT DC value difference calculated by the DC value difference calculator 610 from DCT blocks 1 through 8 and calculates a difference between the maximum value and the minimum value. Also, the image distortion calculator 620 detects a maximum value and a minimum value with respect to a DCT DC value difference from DCT blocks 9 through 16 and calculates a difference between the maximum value and the minimum value. The above process can be performed from a left DCT block to a right DCT block of the image in sequential order, and can be simultaneously performed, but embodiments of the present invention are not limited thereto.

The extraction domain determiner 630 assigns extraction domain values "1" or "−1" to a DCT block determined as an extraction domain where a DCT block extracts a watermark by using Equation (3), and assigns an extraction domain value "0" to a DCT block not determined as the extraction domain. In an exemplary embodiment of the present invention, the extraction domain determiner 630 determines that a watermark "1" is inserted when the extraction domain value corresponds to "1", and determines that a watermark "0" is inserted when the extraction domain value corresponds to "−1".

Referring again to FIG. 5, the watermark extractor 540 extracts a watermark bit inserted in the extraction domain selected by the extraction domain selector 530. Specifically, the extraction domain is selected by Equation (3), and the watermark extractor 540 extracts a watermark inserted in the image by using an extraction domain value assigned to the selected extraction domain.

In an exemplary embodiment of the present invention, four high-ranking slices and six low-ranking slices of the image correspond to a place where a period of time, a caption, and other information are located, and the four high-ranking slices and the six low-ranking slices can be excluded from the extraction domain extracting a watermark.

In an exemplary embodiment of the present invention, the watermark inserted in the image can be extracted by using Equation (4) below in the watermark extractor.

$$D_k = \sum_{\forall y: \left\lfloor \frac{(y \bmod 2K)+1}{2} \right\rfloor = k} \sum_{\forall x} A(x, y) \quad (4)$$

$$\overline{b}_k = \begin{cases} 1, & \text{if } D_k \geq 0 \\ 0, & \text{otherwise} \end{cases}$$

Here, $D_k$ denotes a reference value of determining a watermark bit, and $\overline{b}_k$ denotes an extracted watermark bit.

As illustrated in Equation (4), when a total sum of adding extraction domain values of a domain where an identical watermark bit is inserted, in a remaining domain excluding four high-ranking slices and six low-ranking slices is greater than or equal to "0", it is determined that a watermark bit "1" is inserted, and it is determined that a watermark bit "0" is inserted in other cases.

Figure 8:
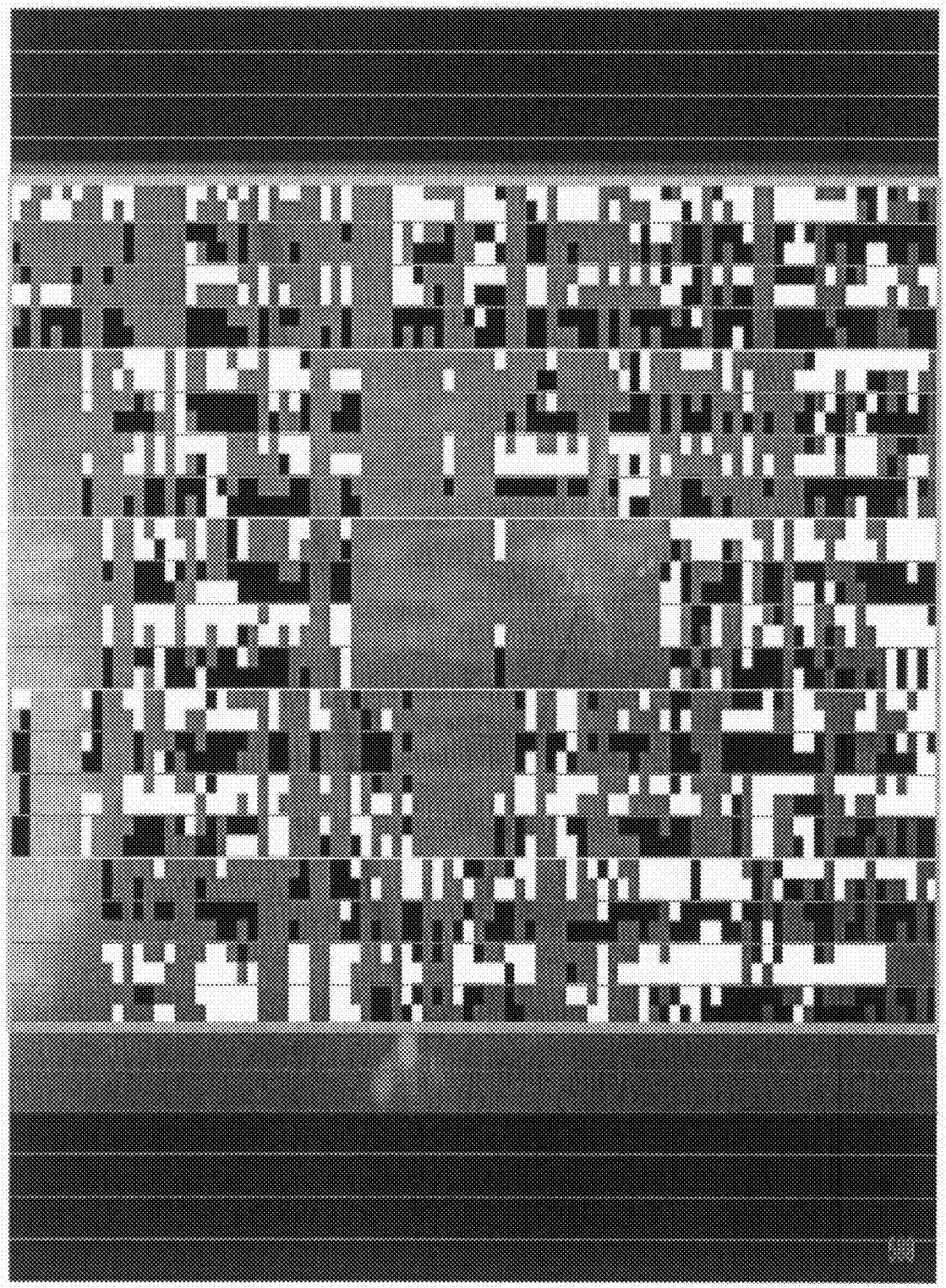
FIG. 8 illustrates an example of an image in a state where an extraction domain value is assigned according to an exemplary embodiment of the present invention.
Figure 9:
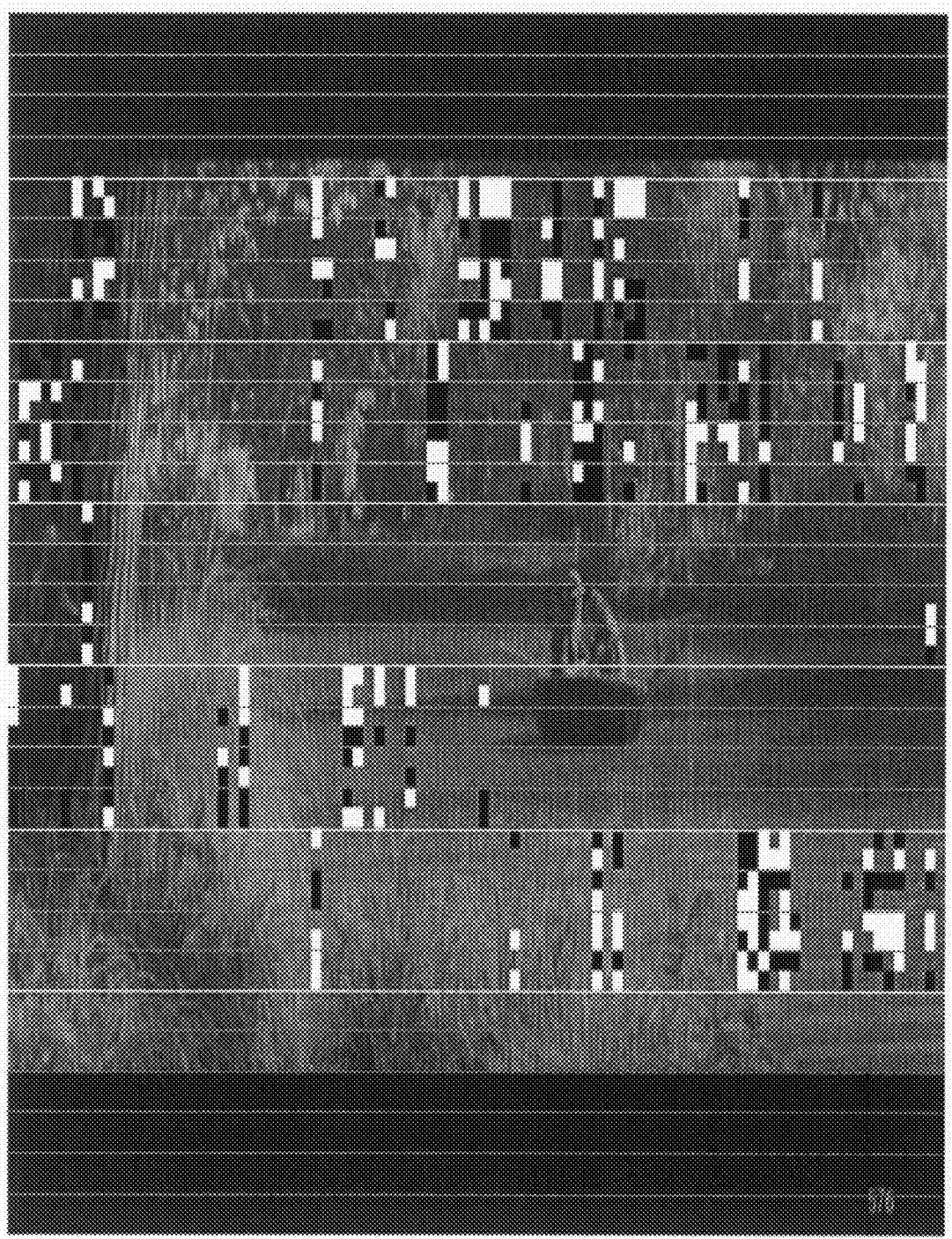
FIG. 9 illustrates an example of another image in a state where an extraction domain value is assigned according to an exemplary embodiment of the present invention.

Referring to FIGS. 8 and 9, FIG. 7 is described further below.

FIGS. 8 and 9 illustrate examples of images in a state where an extraction domain value is assigned according to exemplary embodiments of the present invention.

In an exemplary embodiment of the present invention, a white DCT block indicates that an extraction domain value "1" is assigned, and a black DCT block indicates that an extraction domain value "−1" is assigned.

Therefore, watermark bits inserted in the image, b1, b2, b3, and b4 can be extracted by using Equation (4). Specifically, b1 is "1", b2 is "0", b3 is "1" and b4 is "0". Here, the watermark bit b4 is "1", determined simply with an extraction domain value added in the last slice where a watermark bit b4 is inserted. However, since the watermark bit b4 is extracted by adding all extraction domain values of slices where the watermark bit b4 is inserted, the watermark bit b4 is "0".

As illustrated in FIG. 9, even though image distortion is significantly generated in an image of FIG. 9, a watermark bit can be extracted by adding extraction domain values where an identical watermark bit is inserted. Specifically, a watermark bit can extract b1, b2, b3, and b4 by using Equation (4), and the extracted watermark bit b1 is "1", b2 is "0", b3 is "1" and b4 is "0".

Similar to the above description, a video watermark detection apparatus according to embodiments of the present invention has an advantage in that a watermark can be correctly extracted, even when image distortion is significantly generated such as in the case of an attack via a DVI capture board and the like.

Figure 10:
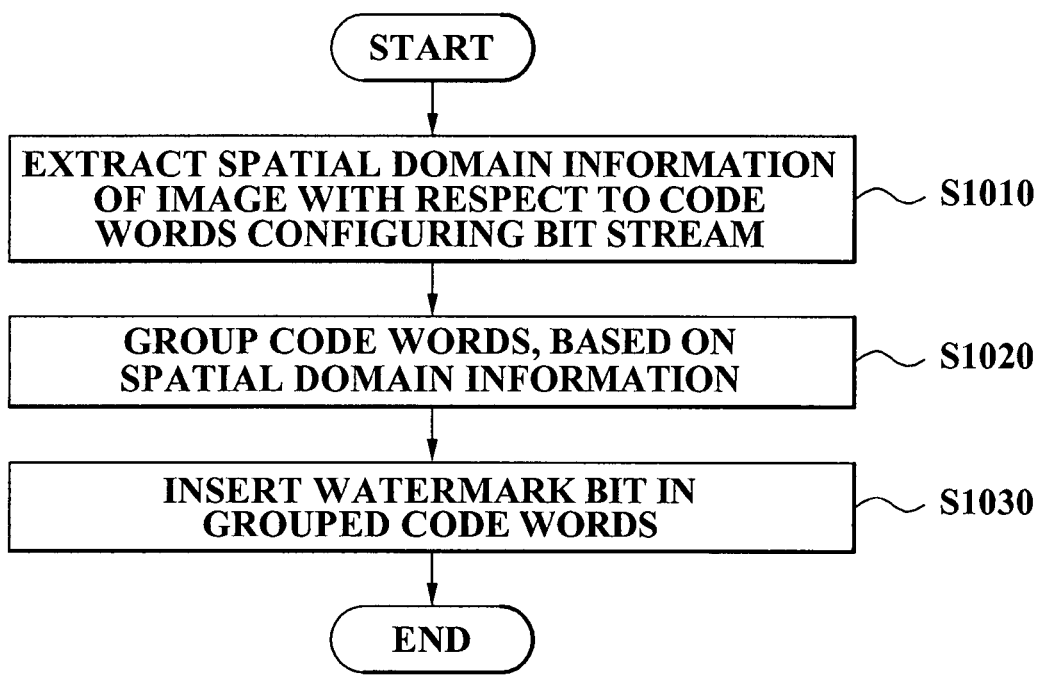
FIG. 10 is a flowchart illustrating a video watermark insertion method according to an exemplary embodiment of the present invention.

FIG. 10 is a flowchart illustrating a video watermark insertion method according to an exemplary embodiment of the present invention.

Referring to FIG. 10, an exemplary video watermark insertion method extracts spatial domain information of an image with respect to code words configuring a bit stream compressed by a video encoder at step (S1010). Specifically, in order to segment and group the compressed bit stream into the spatial domain of the image, the spatial domain information of the image is extracted from each of the code words.

In an exemplary embodiment of the present invention, the video encoder can be comprised of an MPEG-2 encoder, an MPEG-4 encoder, or the like.

The code words are grouped based on the extracted spatial domain information at step (S1020). In an exemplary embodiment of the present invention, the grouping groups the code words into the spatial domain of each predetermined horizontal slice. Specifically, to show domains respectively segmented for each horizontal slice in the spatial domain, the compressed bit stream is grouped for each spatial domain of each horizontal slice.

A watermark bit is inserted in the code words grouped for the each horizontal slice at step (S1030). In an exemplary embodiment of the present invention, the watermark bit is added to all DCT DC values configuring the slice.

Figure 11:
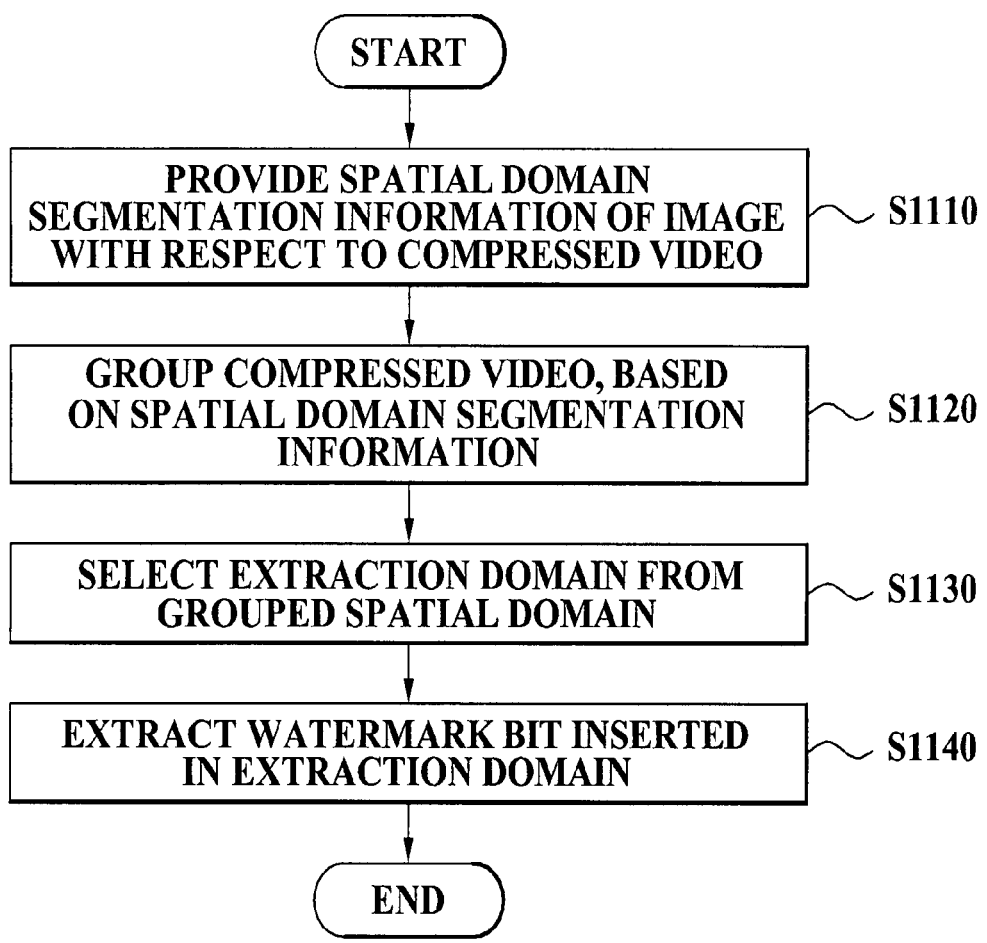
FIG. 11 is a flowchart illustrating a video watermark detection method according to an exemplary embodiment of the present invention.

FIG. 11 is a flowchart illustrating a video watermark detection method according to an exemplary embodiment of the present invention.

Referring to FIG. 11, a compressed video is input and spatial domain segmentation information of an image with respect to a compressed video is provided at step (S1110).

In an exemplary embodiment of the present invention, the provided spatial domain segmentation information can be comprised of the spatial domain segmentation information segmented for each predetermined horizontal slice with respect to the compressed video.

The compressed video is grouped, based on the spatial domain segmentation information, and a grouped spatial domain is generated at step (S1120). Specifically, the code words configuring a bit stream of the compressed video are grouped into the spatial domain of each predetermined horizontal slice.

An extraction domain is selected for extracting a watermark from the grouped spatial domain at step (S1130).

In an exemplary embodiment of the present invention, the extraction domain can be selected by analyzing video image distortion, and can be comprised of a monotonic domain of the image.

Here, a process of selecting the extraction domain is described in greater detail below with reference to FIG. 12.

FIG. 12 is a flowchart illustrating operation (S1130) of FIG. 11 in greater detail.

Referring to FIG. 12, the selecting step first calculates a difference between a DCT DC value of an original image and a DCT DC value of the compressed image in an identical DCT block at step (S1210).

In an exemplary embodiment of the present invention, the DCT DC value difference can be calculated via Equation (1) as described in detail above.

A maximum DCT DC value difference and a minimum DCT DC value difference of DCT blocks where vertical locations are identical from DCT blocks configuring slices where bit rows of the watermark are inserted, i.e. a maximum value and a minimum value, are extracted from the calculated DCT DC value differences at step (S1220), and a difference between the extracted maximum value and the extracted minimum value is calculated at step (S1230).

In an exemplary embodiment of the present invention, the difference between the maximum value and the minimum value can be calculated via Equation (2) as described in detail above.

In an exemplary embodiment of the present invention, the difference between the maximum value and the minimum value can be extracted from DCT DC value differences of DCT blocks determined according to a length of an inserted watermark bit row. For example, when a length of a watermark bit row is "4", the maximum value and the minimum value can be extracted from DCT DC value differences of eight DCT blocks where vertical locations are identical.

Next, an extraction domain for extracting the watermark is selected, based on the difference between the maximum value and the minimum value at step (S1240).

In an exemplary embodiment of the present invention, an extraction domain value is assigned in order to extract a watermark in DCT blocks selected as the extraction domain, and the assigned extraction domain value can be "1" or "−1".

In an exemplary embodiment of the present invention, the extraction domain value can be assigned by using Equation (3) as described in detail above.

The extraction domain is selected via the above process, and the extraction domain value for extracting a watermark bit is assigned to the selected extraction domain.

Referring again to FIG. 11, when the extraction domain is selected, a watermark bit is extracted from the selected extraction domain at step (S1140).

In an exemplary embodiment of the present invention, the watermark can be extracted from the spatial domain of the image excluding four high-ranking slices and six low-ranking slices where a period of time, a caption, and other information are located from segmented slices of the image.

In an exemplary embodiment of the present invention, a watermark bit can be extracted by using Equation (4) as described in detail above.

A video watermark insertion method and a video watermark detection method according to the above-described exemplary embodiments of the present invention can be recorded in computer-readable media including program instructions to implement various operations embodied by a computer. The media can also include, alone or in combination with the program instructions, data files, data structures, and the like. The media and program instructions can be comprised of those specially designed and constructed for the purposes of embodiments of the present invention, or they can be of a kind well-known and available to those skilled in the art of computer software. Examples of computer-readable media include but are not limited to magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as that produced by a compiler, and files containing higher level code that can be executed by a computer using an interpreter. The described hardware devices can be configured to act as one or more software modules in order to perform the operations of the above-described exemplary embodiments of the present invention.

An aspect of exemplary embodiments of the present invention is to provide an apparatus and method of watermarking a video in a compression domain that is capable of substantially resisting a recompression attack and a capture attack via a DVI board.

Another aspect of exemplary embodiments of the present invention is to provide an apparatus and method of watermarking a video that is capable of extracting an inserted watermark from a monotonic domain of a spatial domain of an image segmented in a horizontal slice in a compression domain of an image captured via a DVI board.

Another aspect of exemplary embodiments of the present invention is to provide an apparatus and method of watermarking a video that is capable of extracting a domain where distortion is not greatly generated, from an image, and correctly extracting a watermark from an extraction domain, despite the image being greatly distorted.

While the present invention has been shown and described with reference to certain exemplary embodiments thereof, it will be understood by those skilled in the art that various changes in form and detail can be made therein without departing from the spirit and scope of the invention as defined by the appended claims and their equivalents.

What is claimed is:

1. A video watermark detection apparatus, comprising:
   an information provider for providing spatial domain segmentation information of an image with respect to a compressed video;
   a grouping unit for grouping the compressed video, based on the spatial domain segmentation information, and generating a grouped spatial domain;
   an extraction domain selector for selecting an extraction domain for extracting a watermark from the grouped spatial domain, wherein the extraction domain is selected based on video image distortion of the compressed video;
   a watermark extractor for extracting a watermark bit inserted in the extraction domain; and
   a memory for storing the extracted watermark bit.

2. The apparatus of claim 1, wherein the information provider is configured to provide the spatial domain segmentation information by segmenting the spatial domain of the image for each predetermined horizontal slice.

3. The apparatus of claim 2, wherein the extraction domain selector comprises:
   a direct current (DC) value difference calculator for calculating a difference between a discrete cosine transform (DCT) DC value of an original image and a DCT DC value of the compressed image in an identical DCT block;
   an image distortion calculator for calculating a difference between a maximum value and a minimum value from the calculated DCT DC value difference of DCT blocks in which vertical locations are identical, from DCT blocks disposed in slices in which bit rows of the watermark are inserted; and
   an extraction domain determiner for selecting an extraction domain for extracting the watermark, based on the difference between the maximum value and the minimum value.

4. The apparatus of claim 3, wherein the extraction domain determiner is configured to select the extraction domain for extracting the watermark when the difference between the maximum value and the minimum value is less than a predetermined value.

5. The apparatus of claim 4, wherein the extraction domain determiner is configured to compare a DC value difference of each DCT block with an average value difference between the maximum value and the minimum value when the difference between the maximum value and the minimum value is less than the predetermined value, and establish a value corresponding to each DCT block as a result of the comparison.

6. The apparatus of claim 5, wherein the established value comprises any one of a 1, 0, and −1.

7. The apparatus of claim 5, wherein the watermark extractor is configured to add the established values in each DCT block of the extraction domain and extract the watermark bit corresponding to the added value.

8. The apparatus of claim 2, wherein the watermark extractor is configured to extract the watermark from the spatial domain of the image excluding a predetermined number of high slices and low slices from the spatial domain of the image.

9. The apparatus of claim 8, wherein the number of high slices and low slices is four and six, respectively.

10. The apparatus of claim 1, wherein the extraction domain selector is configured to select a monotonic domain of the image as the extraction domain for extracting the watermark.

11. A video watermark detection method, comprising:
    providing spatial domain segmentation information of an image with respect to a compressed video;
    grouping the compressed video, based on the spatial domain segmentation information, and generating a grouped spatial domain;
    selecting an extraction domain for extracting a watermark from the grouped spatial domain, wherein the extraction domain is selected based on video image distortion of the compressed video; and
    extracting a watermark bit inserted in the extraction domain.

12. The method of claim 11, wherein the step of providing spatial domain segmentation information provides the spatial domain segmentation information by segmenting the spatial domain of the image for each predetermined horizontal slice.

13. The method of claim 12, wherein the step of selecting an extraction domain comprises:

calculating a difference between a DCT DC value of an original image and a DCT DC value of the compressed image in an identical DCT block;

calculating a difference between a maximum value and a minimum value from the calculated DCT DC value difference of DCT blocks in which vertical locations are identical from DCT blocks disposed in slices in which bit rows of the watermark are inserted; and selecting an extraction domain for extracting the watermark based on the difference between the maximum value and the minimum value.

14. The method of claim 13, wherein the step of selecting an extraction domain selects the extraction domain for extracting the watermark when the difference between the maximum value and the minimum value is less than a predetermined value.

15. The method of claim 14, wherein the extraction domain determiner is configured to compare a DC value difference of each DCT block with an average value difference between the maximum value and the minimum value when the difference between the maximum value and the minimum value is less than the predetermined value, and establish a value corresponding to each DCT block as a result of the comparison.

16. The method of claim 15, wherein the step of extracting the watermark adds the established values in the each DCT block of the extraction domain and extracts the watermark bit corresponding to the added value.

17. The method of claim 12, wherein the step of extracting the watermark extracts the watermark from the spatial domain of the image excluding a predetermined number of high slices and low slices from the spatial domain of the image.

18. The method of claim 11, wherein the step of selecting an extraction domain selects a monotonic domain of the image as the extraction domain for extracting the watermark.

19. A non-transitory computer-readable recording medium having stored thereon instructions for providing a video watermark detection method, comprising:

a first set of instructions for providing spatial domain segmentation information of an image with respect to a compressed video;

a second set of instructions for grouping the compressed video, based on the spatial domain segmentation information, and generating a grouped spatial domain;

a third set of instructions for selecting an extraction domain for extracting a watermark from the grouped spatial domain, wherein the extraction domain is selected based on video image distortion of the compressed video; and a fourth set of instructions for extracting a watermark bit inserted in the extraction domain.

* * * * *